US012744027B2

(12) United States Patent
Noshari et al.

(10) Patent No.: US 12,744,027 B2
(45) Date of Patent: Sep. 22, 2026

(54) ACOUSTIC SYSTEM FOR USE IN AN INTERIOR OF AN AIRCRAFT, AIRCRAFT SEAT, AIRCRAFT BED, AND AIRCRAFT

(71) Applicant: AIRCRAFT CABIN MODIFICATION GMBH, Memmingen (DE)

(72) Inventors: Arash Noshari, Hamburg (DE); Rami Thaher, Hamburg (DE)

(73) Assignee: Aircraft Cabin Modification GmbH, Memmingen (DE)

(*) Notice: Subject to any disclaimer, the term of this patent is extended or adjusted under 35 U.S.C. 154(b) by 283 days.

(21) Appl. No.: 18/716,037

(22) PCT Filed: Dec. 8, 2022

(86) PCT No.: PCT/EP2022/084980
§ 371 (c)(1),
(2) Date: Jun. 3, 2024

(87) PCT Pub. No.: WO2023/104965
PCT Pub. Date: Jun. 15, 2023

(65) Prior Publication Data

US 2026/0018156 A1 Jan. 15, 2026

(30) Foreign Application Priority Data

Dec. 8, 2021 (EP) .................................... 21213172

(51) Int. Cl.
*G10K 11/178* (2006.01)

(52) U.S. Cl.
CPC .............................. *G10K 11/17873* (2018.01)

(58) Field of Classification Search
CPC ........ B64D 11/00154; G10K 11/17873; G10K 11/17857; G10K 11/17881; G10K 2210/1281; G10K 2210/3221
(Continued)

(56) References Cited

U.S. PATENT DOCUMENTS 5,987,144 A * 11/1999 Carme ............ G10K 11/17861 381/71.7
2002/0076059 A1 6/2002 Joynes
(Continued)

FOREIGN PATENT DOCUMENTS

CN 214588015 11/2021
EP 3964388 A1 3/2022

OTHER PUBLICATIONS

Communication Pursuant to Article 94(3) EPC regarding corresponding European Patent Application No. 21213172.6, mailed Sep. 9, 2024.

(Continued)

*Primary Examiner* — Paul Kim
(74) *Attorney, Agent, or Firm* — Lewis & Reese, PLLC

(57) ABSTRACT

The invention relates to an acoustic system (10) for use in an interior of an aircraft (300), including an upper body support section (12) for use with an aircraft seat (100) and/or an aircraft bed (200). The upper body support section (12) defines at least one resting surface (14) configured for at least a portion of a user's upper body (15) to rest against. The acoustic system (10) further includes at least one actuator (18). The actuator (18) is embedded at least partially within the upper body support section (12) and configured to generate soundwaves. The invention also relates to an aircraft seat (100), an aircraft bed (200) and an aircraft (300).

17 Claims, 3 Drawing Sheets

(58) Field of Classification Search
USPC .......................................................... 381/71.4
See application file for complete search history.

(56) References Cited

U.S. PATENT DOCUMENTS

| | | | |
|---|---|---|---|
| 2013/0163774 A1 | 6/2013 | Maeda | |
| 2013/0243225 A1 | 9/2013 | Yokota | |
| 2018/0277089 A1* | 9/2018 | Tonon .................. | G10K 11/178 |
| 2018/0281965 A1 | 10/2018 | Pons | |
| 2021/0021932 A1 | 1/2021 | Frost et al. | |
| 2021/0074258 A1 | 3/2021 | Konno et al. | |

OTHER PUBLICATIONS

Extended European Search Report regarding corresponding European Patent Application No. 21213172.6, mailed May 19, 2022.

International Search Report and Written Opinion regarding corresponding PCT Application No. PCT/US2022/084980, mailed Mar. 15, 2023.

* cited by examiner

ACOUSTIC SYSTEM FOR USE IN AN INTERIOR OF AN AIRCRAFT, AIRCRAFT SEAT, AIRCRAFT BED, AND AIRCRAFT

INTRODUCTION

Air travel is widespread nowadays, being used frequently by a relatively large proportion of the world's population for private and/or business-related purposes. In general, air travel may be conducted in unpowered aircrafts, such as gliders or parachutes, and in powered aircrafts, such as propeller aircrafts and/or jet aircrafts.

In particular in powered airplanes and/or helicopters, air travel is considered to be a relatively fast and convenient way of traveling for private and/or business-related purposes. Moreover, many people operate aircrafts, either powered and/or unpowered aircrafts, during their leisure time as a hobby.

However, there are some disadvantages and/or nuisances involved in travelling via aircraft. For one, many aircraft flights cover relatively long distances which may lead to relatively long periods of time spent in-flight in the aircraft. During most of this time, the occupants of the aircraft, i.e., the passengers and/or the flight crew, are confined to their aircraft seats or aircraft beds which may limit the quality of the time spent in-flight in the aircraft for the occupants.

Moreover, the flight of an aircraft is associated with a range of noises being effected by the aircraft itself, e.g., by the propulsion system of the aircraft, and/or through interaction with the aircraft's environment, e.g., by flow noise caused by the flow of air along the outer surface of the aircraft.

Hence, providing a comfortable and/or an appealing environment to the occupants of the aircraft during the respective aircraft flight is of utmost importance to the operators of aircrafts, in particular airline companies which operate commercial and/or cargo-carrying aircrafts. For this reason, many in-flight amenities are provided by various aircraft operators, in particular airline companies. In many cases, the quality and the amount of the provided amenities have risen over the years.

However, based on the prior art, there remains a need to increase the comfort and/or appeal in an aircraft.

It is therefore an object of the present invention to provide an enhanced in-flight environment in an aircraft to the occupants of the aircraft.

SUMMARY

This object is achieved by an acoustic system for use in an interior of an aircraft defined by the features of claim 1 according to a first aspect of the invention. Variations and further developments are defined by the features of the dependent claims.

Accordingly, the present invention, according to a first aspect, relates to an acoustic system for use in an interior of an aircraft. The system includes an upper body support section for use with an aircraft seat and/or an aircraft bed, the upper body support section defining at least one resting surface configured for at least a portion of a user's upper body to rest against; and at least one actuator, wherein the actuator is embedded at least partially within the upper body support section and configured to generate soundwaves.

The acoustic system includes an upper body support section for use with an aircraft seat and/or an aircraft bed. More specifically, the term "for use with" may mean that the upper body support section may be configured to be attached to an aircraft seat and/or an aircraft bed. For instance, the upper body support section and/or the aircraft seat and/or the aircraft bed may include an attachment mechanism configured to attach the upper body support section to the aircraft seat and/or the aircraft bed. Preferably, the attachment mechanism includes a release mechanism for releasing the attachment of the upper body support section to the aircraft seat and/or the aircraft bed so that the upper body support section may be removed again from the aircraft seat and/or the aircraft bed. Preferably, the attachment mechanism is configured as a quick-release mechanism to allow the upper body support section to be removed from the aircraft seat and/or the aircraft bed relatively quickly and/or via a simple operation of the attachment mechanism. This may allow and/or facilitate retrofitting existing aircraft seats and/or aircraft beds with the upper body support section including the integrated actuator.

Alternatively, the upper body support section may be formed integrally with the aircraft seat and/or the aircraft bed, such as with a backrest of the aircraft seat and/or a lying portion of the aircraft bed, or the upper body support section may at least be connected with the aircraft seat and/or the aircraft bed in a non-separable manner such that the upper body support section cannot be separated from the rest of the aircraft seat and/or the aircraft bed, respectively, without substantially compromising the integrity of the upper body support section and/or the aircraft seat and/or the aircraft bed.

The upper body support section may be any structure configured to support at least a portion of the user's upper body, e.g., the user's neck and/or shoulder(s) and/or head and/or back and/or arm(s), when the user is sitting in the aircraft seat and/or lying on the aircraft bed. The upper body support section may be configured as a headrest and/or a neck support and/or a backrest and/or armrest. Preferably, the upper body support section is configured as a headrest and/or a neck support to provide as short a distance as possible between the actuator and the user's ear(s). Moreover, retrofitting existing aircraft seats and/or aircraft beds may be particularly facilitated when configuring the upper body support section as a headrest and/or a neck support since a headrest and/or a neck support can generally be removed and/replaced in a relatively simple manner to retrofit an existing aircraft seat and/or aircraft bed with a headrest and/or a neck support as a part of the acoustic system described herein.

The upper body support section defines at least one resting surface configured for at least a portion of a user's upper body, preferably the user's head and/or neck, to rest against. Preferably, the resting surface is formed by an outer surface of the upper body support section. The resting surface may be a substantially planar surface. However, the resting surface may also be a non-planar surface, such as in the shape of a curved and/or partially angled surface. In particular, the resting surface may be formed to conform or at least partially conform to a shape of a user's upper body, preferably the user's head and/or neck, e.g., a back side of the user's head, to increase the comfort of the upper body support section for the user when at least a portion of the user's upper body rests against the resting surface. The resting surface may be at least partially deformable. For instance, the resting surface may be an outer surface of a deformable material of the upper body support section, such as a cushion element provided as part of the upper body support section. For this purpose, the upper body support section may include one or more cushion elements to provide a more comfortable surface for the user's upper body to rest against and/or to prevent, or at least reduce the risk of, injury to the user through contact between the user's body, e.g., the user's head or neck, and the upper body support section. Alternatively, or additionally, the upper body support section may include a cover element which covers at least a portion of an outer contour of the upper body support section, wherein preferably the cover element defines at least a portion of the resting surface.

The upper body support section may be configured to be adjustable in height to optimize the effects of the soundwaves generated by the actuator to the user seated in the aircraft seat or lying on the aircraft bed, e.g., by shortening a distance between the actuator and the user's ear(s) by being able to adjust the height of the upper body support section, e.g., to be substantially aligned with and/or brought closer to the user's head and/or neck, preferably the user's ear(s), and/or to substantially lie in a single plane with the user's ears. For this purpose, the upper body support section may be movable relative to another section of the aircraft seat and/or the aircraft bed, e.g., relative to a backrest of the aircraft seat and/or to a lying portion of the aircraft bed. The upper body support section may be manually movable to adjust the height of the upper body support section. Alternatively, or additionally, the upper body support section may include at least one motor configured to drive and move the upper body support section to adjust the height thereof.

Preferably, the upper body support section has a length, which extends substantially laterally in a direction along a coronal plane of the user, when the user is sitting in the aircraft seat and/or lying on the aircraft bed, of at least 20 cm, preferably at least 25 cm, more preferably at least 30 cm, more preferably at least 35 cm, most preferably at least 40 cm.

Preferably, the upper body support section has a surface area which faces the user, when the user is sitting in the aircraft seat and/or lying on the aircraft bed, of at least 200 $cm^2$, more preferably at least 250 $cm^2$, more preferably at least 300 $cm^2$, more preferably at least 350 $cm^2$, more preferably at least 400 $cm^2$, more preferably at least 450 $cm^2$, more preferably at least 500 $cm^2$, more preferably at least 550 $cm^2$, more preferably at least 600 $cm^2$, more preferably at least 650 $cm^2$, more preferably at least 700 $cm^2$, more preferably at least 750 $cm^2$, most preferably at least 800 $cm^2$.

Providing such a minimum length and/or minimum surface area of the upper body support section may facilitate providing a configuration in which sections of the upper body support section are adjustably movable relative to each other. Moreover, this may also provide a larger area which can be excited by the actuator, which may facilitate generating low frequencies, e.g., to increase the effectiveness and/or efficiency of the noise cancellation provided by the system described herein for sounds having low frequencies.

To further increase the effectiveness and/or efficiency of the system described herein, in particular the noise cancellation provided by the system, a plurality of sections of the aircraft seat and/or aircraft bed may each be provided with at least one actuator, and optionally also with at least one sound sensing device. For instance, a section of the aircraft seat and/or aircraft bed which provides support to the user's head, e.g., a headrest and/or a neck support, and a section of the aircraft seat and/or aircraft bed which provides support to the user's back, e.g., a backrest, may each be equipped with at least one actuator, and optionally also with at least one sound sensing device. This may further increase the area which can be excited by the system described herein, e.g., to facilitate generating low frequencies, e.g., to increase the effectiveness and/or efficiency of the noise cancellation provided by the system described herein for sounds having low frequencies. Alternatively, or additionally, one or more structures which are arranged externally from the aircraft seat and/or aircraft bed within the interior of the aircraft, preferably in proximity to the aircraft seat and/or aircraft bed, may also be equipped with at least one actuator to further increase the area which can be excited by the system described herein. For instance, one or more panels, walls, separating elements or other structures which are arrangeable within the interior of the aircraft and at least partially about the aircraft seat and/or aircraft bed may each be equipped with at least one actuator.

The upper body support section may also be configured to be rotatable about an axis of rotation relative to a section of the aircraft seat and/or the aircraft bed, preferably relative to a backrest of the aircraft seat and/or a lying portion of the aircraft bed. This may optimize the effects of the soundwaves generated by the actuator to the user seated in the aircraft seat or lying on the aircraft bed by being able to rotate, and thus position, the upper body support section accordingly to adjust the alignment and/or position of the actuator relative to the user's ears.

The acoustic system further includes at least one actuator. The actuator is embedded at least partially within the upper body support section and configured to generate soundwaves. The actuator may be mounted within the upper body support section in a fixed manner. The actuator, and optionally further components of the system, such as wiring and/or electrical components, may be configured as a coherent module which may be mountable within, and optionally also removable from, the upper body support section. For this purpose, the upper body support section may include at least one accessing element configured to allow external access to the actuator, e.g., the coherent module including the actuator, and optionally also further components of the acoustic system.

The actuator may be any element configured to excite at least one surface, preferably an outer surface of the upper body support section and/or a surface within the upper body support section, to generate soundwaves in at least a section of the interior of the aircraft, preferably in at least a section of a proximity of the upper body support section and/or in at least a section of a proximity of a user seated in the aircraft seat or lying in the aircraft bed. The actuator may be configured to excite a plurality of surfaces, the surfaces preferably being arranged on an outer surface of the upper body support section and/or within the upper body support section.

In order to generate the soundwaves, the actuator may be powered by a source of energy, e.g., electrically by one or more batteries and/or by an aircraft electrical system, and configured to receive a signal, e.g., from a controller, and convert the source of energy powering the actuator into one or more motions of the actuator. Thus, the actuator may also be referred to as a transducer. The actuator may be configured to transmit the motion(s) to the respective surface, which may excite the surface. The surface in turn may effect pressure waves, i.e. soundwaves, which may propagate through at least a section of the interior of the aircraft, preferably in the proximity of the upper body support section and/or in at least a section of a proximity of a user seated in the aircraft seat or lying in the aircraft bed.

By embedding the actuator, which is configured to generate soundwaves, at least partially within the upper body support section, an acoustic system capable of generating soundwaves may be provided in close vicinity of the user's ears, or at least closer to the user's ears than soundwave generating devices which are arranged elsewhere. Thus, a relatively short distance between the actuator and at least one of the user's ears, preferably both of the user's ears, may be achieved. This may increase the efficiency and/or the effectiveness of the acoustic system compared with acoustic systems known from the prior art. By minimizing the distance between the actuator and at least one of the user's ears, preferably both of the user's ears, the soundwaves generated by the actuator only have to be propagated across relatively short distances to the user's ear(s), compared with soundwaves which are, for instance, generated from a monitor arranged on the backside of a neighboring aircraft seat, from a ceiling of the aircraft and/or from another location in the interior of the aircraft.

Due to the close proximity of the acoustic system, in particular the actuator, to the user, a lower amplitude of the soundwaves may be sufficient to achieve the same or at least similar effects of acoustic systems which are located farther from the user. This may reduce the power required of the acoustic system and/or the build size of the acoustic system, in particular the actuator. Hence, the components of the acoustic system may be reduced in their size and/or weight compared with acoustic systems which are arranged at greater distances from the user. This may also help reduce the weight in the aircraft, which is critical to save fuel and reduce the pollution caused by the aircraft during flight.

In many cases, occupants in aircrafts wear headphones having respective acoustic systems implemented therein, e.g., due to a relatively low degree of disturbance caused by the headphones during use. The acoustic system described herein is advantageous over the use of headphones since the acoustic system integrated in the upper body support section may be effectively operated without contacting the user's head as opposed to headphones, which are generally required to contact the user's head. This may increase the comfort during use of the acoustic system versus the use of headphones. Moreover, the acoustic system integrated in the upper body support section may allow a greater degree of interaction of the user with the environment around the user, such as for detecting speech and/or noises in the environment more effectively and/or comfortably, and/or a greater freedom of movement of the user during use of the acoustic system. Moreover, a relatively low level of disturbance to other occupants may be achieved due to the close proximity of the actuator, which is arranged in the upper body support section, to the user.

In addition, an upper body support section may provide a larger volume and/or a larger surface for the components of the acoustic system to be stored in and/or arranged on compared with headphones. Thus, for instance, the arrangement of the actuator may be facilitated compared with arranging a corresponding actuator on or in headphones, which may provide a substantially smaller volume and/or smaller surface for storing components of the acoustic system therein and/or thereon, respectively. Thus, for instance, the selection of components for use with the acoustic system described herein may be increased compared with headphones, in particular since the selection is determined to a lesser extent by the allowable dimensions of the components based on the available space and/or surface for arranging the components. Hence, for instance, higher quality components, e.g., the actuator, and/or more cost-efficient components may be used in the acoustic system described herein compared with headphones.

Moreover, since the upper body support section houses the essential components of the acoustic system described herein, implementing the acoustic system into an aircraft seat and/or an aircraft bed may essentially be accomplished by attaching the upper body support section to the aircraft seat and/or aircraft bed. Hence, for instance, the modification efforts for retrofitting existing aircraft seats and/or aircraft beds with the acoustic system described herein may be reduced compared with implementing such acoustic systems or elements in other sections of the aircraft, such as in a wall panel and/or a ceiling of the aircraft, or other sections of the aircraft seat or aircraft bed.

The acoustic system may include at least one proximity sensor to detect a presence of the user's body, preferably the user's upper body, preferably the user's head and/or neck and/or shoulders, in the proximity of the upper body support section. If the user's body is detected, the acoustic system may be configured to activate the acoustic system. If the user's body is not, or no longer, detected by the proximity sensor, the acoustic system may be configured to be deactivated.

The actuator may be configured as an exciter, which is essentially configured similar to a speaker but without a membrane, i.e., a speaker membrane. Exciters are sometimes also referred to as vibration transducers.

The actuator may be configured to generate soundwaves of various amplitudes and/or various frequencies and/or various phases. Preferably, the actuator is configured to generate soundwaves at a frequency from 100 Hz to 15 KHz. Preferably, the actuator is configured to have a resonant frequency which is less than 250 Hz, more preferably less than 200 Hz, more preferably less than 150 Hz, preferably at room temperature, e.g., preferably from 15° C. to 30° C., more preferably from 15° C. to 25° C., more preferably from 15° C. to 20° C.

Alternatively, or additionally, the actuator preferably has a nominal value of a DC resistance (DCR) from 8 to 15 Ohms, preferably 8 or 15 Ohms, with a tolerance of +/−17.5%, preferably at room temperature, e.g., preferably from 15° C. to 30° C., more preferably from 15° C. to 25° C., more preferably from 15° C. to 20° C.

Alternatively, or additionally, the actuator may be configured to generate white noise, preferably filtered white noise, with a crest factor from 4 dB to 18 dB, preferably from 4 dB to 16 dB, more preferably from 4 dB to 14 dB, more preferably from 4 dB to 12 dB, more preferably from 4 dB to 10 dB, more preferably from 4 dB to 8 dB, more preferably from 6 dB to 8 dB. This may provide a comfortable and/or soothing sound environment to the user. For the purpose of generating filtered white noise, the acoustic system may include one or more filtering devices.

Alternatively, or additionally, the actuator may have an RMS power handling with at least 1 W, preferably at least 2 W, more preferably at least 3 W, more preferably at least 4 W, more preferably at least 5 W, referenced to a nominal DCR value of 15 Ohm, filtered white noise, preferably with a crest factor from 4 dB to 18 dB, preferably 4 dB to 16 dB, more preferably 4 dB to 14 dB, more preferably 4 dB to 12 dB, more preferably 4 dB to 10 dB, more preferably 4 dB to 8 dB, more preferably 6 dB to 8 dB.

Alternatively, or additionally, the acoustic system may include at least one high-pass filter at a frequency fHp from 50 Hz to 150 Hz, preferably from 75 Hz to 125 Hz, more preferably 100 Hz, preferably with 4 dB to 20 dB per octave, more preferably 6 dB to 18 dB, more preferably 8 dB to 16 dB, more preferably 10 dB to 14 dB, more preferably 12 dB. Alternatively, or additionally, the acoustic system may include at least one low pass filter at a frequency fLp from 7,500 Hz to 20,000 Hz, preferably from 10,000 Hz to 20,000

Hz, more preferably from 10,000 Hz to 17,500 Hz, more preferably from 12,500 Hz to 17,500 Hz, more preferably 15,000 Hz, preferably with 4 dB to 20 dB per octave, more preferably 6 dB to 18 dB, more preferably 8 dB to 16 dB, more preferably 10 dB to 14 dB, more preferably 12 dB.

The actuator may be configured to provide a sound pressure level, preferably an A-weighted sound pressure level, at 1 W/1 m and perpendicular to an installation plane of the actuator of:

90 dB (+4 dB, −4 dB) at a frequency of 1,000 Hz;

90 dB (+8 dB, −8 dB) at a frequency range of 350 Hz to 6,000 Hz; and/or 90 dB (+8 dB, −10 dB) at a frequency range of 6,000 Hz to 12,500 Hz.

The actuator may be configured to provide a sound pressure level, preferably an A-weighted sound pressure level, at 1 W/1 m of:

90 dB (+6 dB, −6 dB) in A/C X-direction and 90 dB (+6 dB, −6 dB) in A/C Y-direction, at a frequency of 1,000 Hz and an angle a of 30° to 150°;

90 dB (+6 dB, −15 dB) in A/C X-direction and 90 dB (+6 dB, −20 dB) in A/C Y-direction, at a frequency range of 350 Hz to 6,000 Hz and an angle a of 30° to 150°; and/or 90 dB (+6 dB, −15 dB) in A/C X-direction and 90 dB (+6 dB, −25 dB) in A/C Y-direction, at a frequency range of 6,000 Hz to 12,500 Hz and an angle a of 30° to 150°;

wherein the A/C X-direction is in the flight direction of the aircraft and the A/C Y-direction is substantially perpendicular to the A/C X-direction, i.e., to the flight direction of the aircraft, and wherein the angle a is an angle which is formed at an intersection of an installation plane of the actuator, e.g., a surface on which the actuator is mounted, and a line from the point of measurement of the above-identified value(s) to the installation plane, wherein an angle of 90° refers to an arrangement of the actuator in which said line intersects said installation plane perpendicularly.

A total harmonic distortion (THD) of the actuator may be less than 10%, preferably less than 8%, more preferably less than 6%, more preferably less than 4%, more preferably less than 2%, more preferably less than 1%, extracted between 100 Hz and 4,000 Hz (excluding the resonance frequency). The measurement may be performed at 2.5 W. The THD may be determined using current measurement on a Klippel analyzer hardware.

The above-identified specifications/parameters of the actuator, either by themselves or in any desired combination, may enable the actuator to be particularly effective and/or efficient in generating soundwaves, in particular in an interior of an aircraft, and/or for providing active noise reduction within the aircraft.

The respective measurement(s) for determining the above-identified specifications/parameters of the actuator may be performed with a fixed coil and a magnet which is moving, preferably at room temperature, e.g., 20° C., and optionally in a small signal domain with a power of 50 mW, where appropriate.

The acoustic system may be configured to allow a certain, preferably predetermined, degree of speech intelligibility during operation of the acoustic system and the aircraft. Preferably, the speech intelligibility may be defined by a Rapid Speech Transmission Index (RASTI). The RASTI values may be determined according to IEC standard 60268-16. Table 1 below provides values for the RASTI at a variety of location in the aircraft and in various modes of operation of the aircraft.

TABLE 1

| Operational Phase | Location in Aeroplane | | | |
|---|---|---|---|---|
| | Flight Attendant Seats | Flight Attendant Work Stations | Passenger Cabin | Lavatories |
| Parked Engines and APU stopped | 0.6 | 0.6 | 0.6 | 0.6 |
| Parked Engines and APU running | 0.6 | 0.6 | 0.6 | 0.5 |
| Taxying | 0.5 | 0.5 | 0.5 | 0.5 |
| Cruise | 0.5 | 0.5 | 0.5 | 0.5 |
| Final Approach Gear down Flaps extended | 0.5 | 0.5 | 0.5 | 0.5 |

Preferably, the acoustic system is configured to allow a Rapid Speech Transmission Index of at least 0.2, more preferably at least 0.3, more preferably at least 0.4, more preferably at least 0.5, preferably in any location of the aircraft in which soundwaves are generated by the actuator of the acoustic system and/or in any mode of active operation of the aircraft, e.g., during taxying, final approach, cruising, etc. This may allow the intelligibility of communication in the aircraft, e.g., during emergency situations and/or during normal operation of the aircraft, to be enhanced which may increase the comfort and/or safety of the occupants.

The respective measurement(s) for determining the above-identified specifications/parameters of the actuator may be, or be based on, one or more of the following:

Transmission loss up to 85 dB (DIN EN ISO 15186)
Sound power level (DIN ISO 3745)
Noise suppression
Experimental and operational modal analysis
Absorption measurements (DIN EN ISO 354)
Diffuse sound field excitation
Transfer functions to the passenger ear
Cabin optimization
Structure-borne sound insulation
Acoustics at cabin and system level The acoustic system may include a plurality of actuators. Preferably, at least one of the plurality of actuators may be configured to simultaneously and/or sequentially generate soundwaves which differ from soundwaves generated by a second of the plurality of actuators in their amplitudes and/or frequencies and/or phases. A plurality of actuators may also simultaneously and/or sequentially generate soundwaves of substantially the same amplitude and/or frequency and/or phase.

The acoustic system may be configured to play music and/or other audio, such as a film soundtrack and/or in-flight information provided by a flight crew, e.g., a pilot, of the aircraft. Alternatively, or additionally, the acoustic system may be configured to provide active noise reduction to at least one sound present in at least a section of a proximity of the upper body support section.

The sound for which active noise reduction may be provided may be induced by the aircraft itself, e.g., by the propulsion system of the aircraft, and/or through interaction with the aircraft's environment, e.g., by flow noise caused by the flow of air along the outer surface of the aircraft.

Active noise reduction, often also referred to as active noise cancelling or active noise control, is generally achieved by generating a soundwave by the actuator which is counter-phased, or anti-phased, to the soundwave of the sound to be reduced and has substantially the same or similar amplitude as the sound to be reduced. Thus, by superpositioning the soundwave of the sound to be reduced and the soundwave generated by the actuator, the sound to be reduced may effectively be reduced or cancelled. This type of reduction or cancellation is often also referred to as destructive interference.

Since in the acoustic system disclosed herein the actuator is embedded in the upper body support section, which is typically arranged relatively close to the user's ears, when the user is sitting in the aircraft seat and/or lying on the aircraft bed in a normal sitting and/or lying position, the soundwaves may be generated by the actuator in proximity of the user's ears. Thus, a relatively short distance for propagating the soundwaves from the actuator to at least one of the user's ears, preferably both of the user's ears, may be achieved. This may increase the efficiency and/or the effectiveness of the active noise reduction provided by the acoustic system versus arranging the actuator at various other locations, such as other sections of the aircraft, e.g., a wall panel, a ceiling, or another section of the aircraft seat or aircraft bed.

Active noise reduction is generally known from the prior art for use in headphones. However, as detailed above, the acoustic system described herein is advantageous over the use of headphones since the acoustic system integrated in the upper body support section may operate without contacting the user's head as opposed to headphones, which generally require contact with the user's head. This may increase the comfort during use of the acoustic system versus the use of headphones. Moreover, the acoustic system integrated in the upper body support section may allow a greater degree of interaction of the user with the environment around the user, such as for detecting speech and/or noises in the environment more effectively and/or comfortably, and/or a greater freedom of movement of the user during use of the acoustic system.

In addition, an upper body support section may provide a larger volume and/or a larger surface for the components of the acoustic system to be stored in and/or arranged on compared with a set of headphones. Thus, for instance, the arrangement of the actuator and/or one or more sound detecting devices, such as a microphone, on and/or in the upper body support section may be facilitated compared with arranging such detecting devices on or in headphones, which may provide a substantially smaller volume and/or smaller surface for storing components of the acoustic system therein and/or thereon, respectively. Thus, for instance, the selection of components for use with the acoustic system described herein may be increased compared with headphones, in particular since the selection is determined to a lesser extent by the allowable dimensions of the components based on the available space and/or surface for arranging the components. Hence, for instance, higher quality components, e.g., sound detecting devices, and/or more cost-efficient components may be used in the acoustic system described herein compared with headphones.

The sound for which active noise reduction may be provided may include a soundwave with a constant or varying amplitude and/or a constant or varying frequency. The acoustic system may be configured to simultaneously and/or sequentially provide active noise reduction to a plurality of sounds, for instance originating from a plurality of sound sources, present in at least a section of a proximity of the upper body support section. The plurality of sounds may be of the same or different frequency and/or of the same or different amplitude. For instance, the acoustic system may simultaneously and/or sequentially provide active noise reduction to a first sound having a first amplitude and/or a first frequency and a second sound having a second amplitude and/or a second frequency, wherein the first amplitude is different from the second amplitude and/or the first frequency is different from the second frequency. For this purpose, the acoustic system may include a plurality of actuators. However, at least for sequentially providing active noise reduction to a plurality of different sounds, a single actuator may also be used.

Preferably, the acoustic system is configured to provide a, preferably predetermined, minimum degree of active noise reduction to the sound in an external space adjacent to the upper body support section and within a distance of 5 cm to 40 cm, preferably 5 cm to 35 cm, more preferably 5 cm to 30 cm, more preferably 5 cm to 25 cm, most preferably 5 cm to 20 cm, from the resting surface of the upper body support section.

As detailed above, the acoustic system disclosed herein is advantageous in that the actuator is embedded in the upper body support section, which is typically arranged relatively close to the user's ears, when the user is sitting in the aircraft seat and/or lying on the aircraft bed in a normal sitting and/or lying position. Thus, the soundwaves may be generated by the actuator in proximity of the user's ears. Hence, a relatively short distance for propagating the soundwaves from the actuator to at least one of the user's ears, preferably both of the user's ears, may be achieved. This may increase the efficiency and/or the effectiveness of the active noise reduction provided by the acoustic system, which may allow the required and/or desired and/or predetermined propagation range of the soundwaves to be reduced compared with acoustic systems which are arranged farther from the user's ears, while achieving the same or at least similar effects of acoustic systems which are located farther from the user's ears. Thus, the above-identified distance ranges within which a minimum degree of active noise reduction to the sound is provided may be sufficient to provide an effective and/or reliable active noise reduction to sounds which are present within the interior of the aircraft. This may reduce the power required of the acoustic system and/or the build size of the acoustic system, in particular the actuator. Hence, the components of the acoustic system may be reduced in their size and/or weight compared with acoustic systems which are arranged at greater distances from the user. This may also help reduce the weight in the aircraft, which is critical to save fuel and reduce the pollution caused by the aircraft during flight.

Preferably, the minimum degree of active noise reduction is at least 30%, preferably at least 35%, more preferably at least 40%, more preferably at least 45%, more preferably at least 50%, more preferably at least 55%, more preferably at least 60%, more preferably at least 65%, most preferably at least 70%, of an amplitude and/or a sound pressure level of the sound to be reduced. The sound pressure level may be measured or determined in decibel or db. For instance, the acoustic system may be configured to reduce the sound pressure level of the sound to be reduced by 3 to 10 dB. Alternatively, or additionally, the minimum degree of active noise reduction may be at least 30%, preferably at least 35%, more preferably at least 40%, more preferably at least 45%, more preferably at least 50%, more preferably at least 55%, more preferably at least 60%, more preferably at least 65%, more preferably at least 70%, more preferably at least 75%, more preferably at least 80%, more preferably at least 85%, most preferably at least 90%, of a sound energy of the sound to be reduced. Such minimum degrees of active noise reduction, as identified above, provide a noticeable and/or considerable alleviation of noise disturbance to the user seated in the aircraft seat and/or lying on the aircraft bed. This may generate a more comfortable, appealing and relaxing environment in the interior of the aircraft while the user is seated in the aircraft seat and/or lying on the aircraft bed.

The acoustic system may further include, for the purpose of providing active noise reduction, at least one sound sensing device configured to sense at least one sound in the interior of the aircraft, preferably within a distance of 40 cm, preferably 35 cm, more preferably 30 cm, more preferably 25 cm, most preferably 20 cm, from the resting surface. The acoustic system may also include at least one controller configured to receive information related to the sensed sound and to control the actuator to generate at least one sound to at least partially reduce the sensed sound based on the information.

The sound sensing device may be any device configured to sense a sound, e.g., a microphone. The sound sensing device may optionally be configured to determine the information related to the sensed sound, such as a frequency and/or an amplitude and/or a phase of the sensed sound. In particular, determining such information related to the sensed sound may be determined by one or more algorithms which may be stored in and/or applied by the sound sensing device and/or the controller and/or a further component of the acoustic system, such as a processing device. The sound sensing device may provide a signal based on the detected sound, and optionally sample the signal at a constant or variable sampling frequency to determine the information related to the sensed sound. The controller and/or a further component of the acoustic system, such as a processing device, may additionally or alternatively be configured to sample the signal. The acoustic system may include one or more individual sound sensing devices, e.g., microphones, and/or an array or matrix of sound sensing devices.

The sound sensing device may be attached to a portion of the aircraft seat and/or the aircraft bed, respectively, preferably to a portion of the upper body support section thereof. The sound sensing device may be connected to a support structure and/or housed in a housing, the support structure and/or the housing preferably extending from the aircraft seat and/or the aircraft bed, respectively, preferably from the upper body support section, towards the user's ear(s), or at least towards a proximity of the user's ear(s), when the user is sitting in the aircraft seat or lying in the aircraft bed, preferably when the user's head is resting on the resting surface or is at least arranged proximate to the resting surface. This may enable the sound sensing device to be positioned relatively close to the user's ear(s), which may enhance the effectiveness and/or efficiency of the sound sensing device within the context of providing active noise reduction as described herein.

Alternatively, or additionally, the sound sensing device may be integrated in at least a portion of the aircraft seat and/or the aircraft bed, preferably in the upper body support section, e.g., a headrest and/or a neck support. For instance, the sound sensing device may be arranged at least partially within the upper body support section, e.g., in a headrest and/or a neck support, and/or on an outer surface of the upper body support section. This may reduce the obtrusiveness of the sound sensing device, which may increase the user friendliness of the acoustic system described herein, e.g., since the sound sensing device may restrict the freedom of movement of the user to a lesser extent than in a configuration in which the sound sensing device protrudes from the aircraft seat or the aircraft bed, respectively, preferably from a portion of the upper body support section, as described above. However, in a configuration in which the sound sensing device is integrated in at least a portion of the aircraft seat and/or the aircraft bed, preferably in the upper body support section thereof, the distance between the sound sensing device and the user's ear(s) may be increased. To compensate for such an increased distance between the sound sensing device and the user's ear(s) in view of providing an effective active noise cancelling as described herein, the acoustic system may be configured to apply one or more methods to localize one or more sources of sound from which soundwaves, which propagate through the interior of the aircraft in a proximity of a user seated in the aircraft sear or lying in the aircraft bed, originate. More specifically, the acoustic system may be configured to apply one or more beamforming methods to localize one or more sources of sound from which soundwaves, which propagate through the interior of the aircraft in a proximity of a user seated in the aircraft sear or lying in the aircraft bed, originate. The one or more sources of sound may be located in the interior of the aircraft and/or outside of the interior of the aircraft. Based on the localization of the one or more sources of sound, the characteristics of the corresponding soundwaves of the one or more sources of sound at or in close proximity to the user's ears, such as the phase, frequency and/or amplitude of the soundwaves, may be estimated, calculated or otherwise determined, e.g., by means of one or more algorithms, in order to provide an effective active noise cancelling as described herein, e.g., by being able to ensure that one or more soundwaves which are counter-phased, or anti-phased, at the user's ears, with respect to the soundwaves originating from the one or more sources of sound to be cancelled or reduced, may be generated by the actuator to at least partially cancel the soundwaves to be cancelled or reduced.

The acoustic system may provide active noise reduction without a sound sensing device. For instance, if sounds of which the frequency and/or amplitude is/are generally known and/or can be predetermined, for instance, for certain reoccurring sounds, e.g., the sound generated by a propulsion system of the aircraft, a corresponding anti-soundwave may be generated by the actuator without having to sense the sound to be reduced. The phase of the anti-soundwave generated by the actuator may be adjusted, e.g., manually by a user, in order to provide an effective active noise reduction.

The acoustic system may include a plurality of sound sensing devices which may be arranged in different locations in the interior of the aircraft, preferably in the proximity of the upper body support section, e.g., within a distance of 40 cm, preferably 35 cm, more preferably 30 cm, more preferably 25 cm, most preferably 20 cm, from the resting surface of the upper body support section. By increasing the number of sound sensing devices, the effectiveness and/or precision of the active noise reduction of the acoustic system may be increased.

Preferably, the acoustic system, preferably the sound sensing device and/or the controller, is configured to determine information related to a frequency and/or a phase and/or an amplitude of the sensed sound, and optionally to provide the information to the controller, such that the soundwaves generated by the actuator are at least in part based on the determined information. Thus, by basing the generation of the soundwaves, e.g., by determining the frequency and/or amplitude and/or other properties of the soundwaves to be generated by the actuator, the soundwaves generated by the actuator may be tailored more precisely to the sound to be reduced to increase the effectiveness and/or precision of the active noise reduction provided by the acoustic system.

Preferably, the acoustic system, preferably the sound sensing device and/or the controller, is configured to determine whether a frequency and/or a phase and/or an amplitude of the sensed sound fulfills at least one predetermined criterion and to control the actuator to generate at least one sound to at least partially reduce the sensed sound if the predetermined criterion is fulfilled.

The criterion may be a certain range, preferably a predetermined range, e.g., a frequency range and/or a phase range and/or an amplitude range, within which a frequency and/or a phase and/or an amplitude of the sensed sound must lie for the criterion to be fulfilled. Alternatively, or additionally, the criterion may be a certain threshold, e.g., a frequency threshold and/or an amplitude threshold above or below which a frequency and/or an amplitude of the sensed sound must lie for the criterion to be fulfilled.

If the criterion is not fulfilled, the acoustic system may not apply active noise reduction to the sensed sound. This may be the case, e.g., for sounds having frequencies and/or amplitudes which are not perceived as being particularly disturbing and/or for which a desired degree of active noise reduction may not be provided. The criterion may be predetermined and stored in the acoustic system, e.g., in an incorporated and/or external storage medium. Alternatively, or additionally, the criterion may be determined by the user sitting in the aircraft seat and/or lying in the aircraft bed, respectively, e.g. via an input device. Instead of a single criterion, a plurality of criteria may also be applied by the acoustic system.

Preferably, the acoustic system includes a plurality of sound sensing devices. Each sound sensing device may be configured to sense at least one sound in the interior of the aircraft, preferably within a distance of 40 cm, preferably 35 cm, more preferably 30 cm, more preferably 25 cm, most preferably 20 cm, from the resting surface. The controller may be configured to control the actuator to generate at least one sound to at least partially reduce the sensed sound based at least in part on the sensed sounds, in particular based on the characteristics of the sensed sounds. As detailed above, by increasing the number of sound sensing devices, the effectiveness and/or efficiency and/or precision of the active noise reduction of the acoustic system may be increased. In particular, providing a plurality of sound sensing devices may increase the number of sounds which may be sensed and reduced via active noise reduction by the acoustic system. By providing each sound sensing device within the above-identified distances from the resting surface, the effectiveness and efficiency of the active noise reduction by the acoustic system may be increased.

Preferably, a first sound sensing device of the plurality of sound sensing devices is arranged closer to the user's head and/or neck, preferably closer to at least one of the user's ears, when a portion of the user's upper body, e.g., the user's neck and/or shoulder(s) and/or head and/or back and/or arm(s), is resting against the resting surface of the upper body support section, than a second sound sensing device of the plurality of sound sensing devices.

Preferably, the first sound sensing device is arranged substantially in a sound path between the actuator and at least one of the user's ears, when at least a portion of the user's upper body, e.g., the user's neck and/or shoulders and/or head and/or back, is resting against the resting surface of the upper body support section, and the second sound sensing device is arranged outside of the sound path.

On the one hand, the second sound sensing device arranged farther from the user's head and/or neck, preferably outside of the sound path, may detect the sound to be reduced without, or only minimally, detecting the soundwave generated by the actuator. Based hereon, the characteristics, e.g., the frequency and/or phase and/or amplitude, of the soundwaves generated by the actuator may be determined. On the other hand, the first sound sensing device arranged closer to the user's head and/or neck, preferably in the sound path between the actuator and at least one of the user's ears, may detect the sound to be reduced and the soundwaves generated by the actuator. Thus, a superposition of the soundwaves of the sound to be reduced and the soundwaves generated by the actuator may be detected by the first sound sensing device. Hence, the first sound sensing device may help determine the effectiveness of the active noise reduction provided by the actuator. The detection of the superposition of the soundwaves of the sound to be reduced and the soundwaves generated by the actuator, and the information associated therewith, may also be provided as feedback to the acoustic system, e.g., to a controller of the acoustic system, to control the actuator at least partially based on this feedback.

The sound or plurality of sounds for which active noise reduction may be provided by the acoustic system described herein may include a wide variety of different sounds and/or different sound sources from which the sound to be reduced originates. For instance, the sound or plurality of sounds for which active noise reduction may be provided by the acoustic system described herein may be induced by the aircraft itself and/or by the operation of the aircraft, e.g., by components of the aircraft, such as the propulsion system of the aircraft, and/or through interaction with the aircraft's environment, e.g., by flow noise caused by the flow of air along the outer surface of the aircraft, and/or by elements within the aircraft which are unrelated to the operation of the aircraft, e.g., electrical devices and/or other occupants in the aircraft. Preferably, the acoustic system is configured to at least partially reduce sound generated by a propulsion system of the aircraft, preferably including at least one jet engine.

Preferably, the acoustic system further includes a plurality of actuators which are each embedded at least partially within the upper body support section and configured to generate soundwaves. By increasing the number of the actuators, the effectiveness and/or efficiency and/or precision of the acoustic system may be increased. Preferably, at least one of the plurality of actuators may be configured to simultaneously and/or sequentially generate soundwaves which differ from soundwaves generated by a second of the plurality of actuators in their amplitudes and/or frequencies and/or phases. Thus, a wide variety of soundwaves may be effectively and efficiently generated simultaneously and/or sequentially by the plurality of actuators. In the case of active noise reduction provided by the acoustic system, this may enable the acoustic system to provide a more efficient and/or more effective and/or more precise active noise reduction and/or to provide active noise reduction to more sounds and/or to a larger range of sounds. At least two of the plurality of actuators may also simultaneously and/or sequentially generate soundwaves of substantially the same amplitude and/or frequency and/or phase.

Preferably, at least one of the plurality of actuators is configured to simultaneously and/or sequentially generate soundwaves at a different amplitude and/or a different phase and/or a different frequency than at least a different one of the plurality of actuators.

Preferably, the acoustic system further includes an input device configured to receive automated or manual input commands to control at least one feature of the acoustic system. Thus, a user, for instance, the occupant seated in the aircraft seat and/or lying in the aircraft bed having an acoustic system as described herein, may control the function of the acoustic system as desired. This may increase the user-friendliness and/or appeal of the acoustic system to the user.

Preferably, the feature includes at least one of the following: one or more amplitudes of the soundwaves generated by the actuator, one or more frequencies of the soundwaves generated by the actuator, a target area or a plurality of target areas in which soundwaves are to be generated in the upper body support section, a target main direction or a plurality of target main directions in which soundwaves are to be propagated in the interior of the aircraft, a degree of active noise reduction provided by the acoustic system, one or more frequencies of sound to be at least partially reduced by the acoustic system, one or more frequency ranges of sound to be at least partially reduced by the acoustic system, and an activation and/or deactivation of the active noise reduction function.

Preferably, the upper body support section includes at least one excitable surface which is sufficiently rigid such that the actuator can excite the excitable surface to generate soundwaves in the upper body support section. For instance, the surface may have a minimum rigidity such that the actuator may excite the surface to generate soundwaves, and the surface may maintain the excitation, i.e., the generation of soundwaves, for a minimum amount of time, e.g., at least 50 ms, preferably at least 100 ms, more preferably at least 150 ms, more preferably at least 200 ms, more preferably at least 250 ms, more preferably at least 300 ms, more preferably at least 350 ms, more preferably at least 400 ms, more preferably at least 450 ms, more preferably at least 500 ms, more preferably at least 600 ms, more preferably at least 700 ms, more preferably at least 800 ms, more preferably at least 900 ms, more preferably at least 1 s. The excitable surface may also have a maximum damping coefficient to allow sufficient excitation, as described above.

The excitable surface may be an outer surface, e.g., an outer rear surface and/or an outer side surface and/or an outer front surface of the upper body support section. Alternatively, or additionally, the excitable surface may be a surface provided at least partially in the interior of the upper body support section.

Preferably, the upper body support section is at least partially made of one or more acoustically permeable materials. This may allow the soundwaves to propagate at least partially through the acoustically permeable materials. This may increase the flexibility of the configuration of the acoustic system, e.g., by enabling a more flexible arrangement of the actuator within the upper body support section while assuring a sufficient propagation of soundwaves from the actuator to the ear(s) of the use sitting in the aircraft seat and/or lying on the aircraft bed. Portions of the upper body support section may be made of at least one material which is substantially acoustically impermeable. This may be advantageous to allow the soundwaves generated by the actuator to propagate only through certain predetermined sections of the upper body support section or at least the propagation of the soundwaves may be reduced in certain sections of the upper body support section compared with other sections of the upper body support section. This may, for instance, reduce the level of disturbance, which may be caused by the acoustic system, to other occupants in the aircraft.

Preferably, the acoustically permeable material(s) allow(s) at least 30%, preferably at least 40%, more preferably at least 50%, more preferably at least 60%, more preferably at least 70%, more preferably at least 80%, most preferably at least 90%, of an amplitude and/or of a sound pressure level of the soundwaves generated by the actuator to propagate through the acoustically permeable material(s).

The aircraft seat and/or aircraft bed may be made at least partially of a material which provides sound dampening, preferably a minimum degree of sound dampening. This may reduce the noise level of undesired sounds in proximity to the user's ears by passively dampening such noises. Preferably, one or more first portions of the upper body support section provide a higher acoustic permeability than one or more second portions of the upper body support section, which preferably provide a minimum degree of sound dampening. For instance, the upper body support section may include one or more layers of acoustically permeable material and one or more layers of sound dampening material. The actuator may be arranged in or on the upper body support section such that the soundwaves generated by the actuator propagate substantially through the one or more layers of acoustically permeable material, while minimizing the amount of sound dampening material the soundwaves must propagate through. The materials used for the aircraft seat and/or aircraft bed may be suitable for use in aviation, in particular with respect to the requirements set out by the vertical burn test.

Preferably, the upper body support section is configured as a headrest and/or a neck support including at least two lateral wing sections and an intermediate section connecting the wing sections to form a space which is at least partially delimited by the wing sections and the intermediate section to at least partially receive the head and/or neck of a user in the space, when the user's head and/or neck is resting against the resting surface of the headrest or neck support, respectively. Preferably, the wing sections each extend from the intermediate section at an angle from 90° to 175°, preferably from 100° to 165°, more preferably from 110° to 155°, more preferably from 110° to 145°, more preferably from 110° to 135°, most preferably from 110° to 130°, relative to the intermediate section. By providing such a configuration of the headrest and/or neck support in which the space formed by the above-identified sections may at least partially receive the head and/or neck of a user, when the user's head and/or neck is resting against the resting surface of the headrest or neck support, respectively, a semi-closed space may be provided in which the soundwaves generated by the actuator may efficiently and effectively be propagated. The sections delimiting the space may provide a passive noise reduction means by at least partially blocking sounds which are present and/or originating outside of the space from propagating into the space. This may enhance the experience of the acoustic system for the user, either for general generation of sound, such as music, or for active noise reduction provided by the acoustic system. In addition, this may reduce a level of disturbance to other occupants which may be caused by the operation of the acoustic system.

Preferably, the upper body support section is adjustable in height. Configuring the upper body support section to be adjustable in height may optimize the effects of the actuator to the user seated in the aircraft seat or lying on the aircraft bed, e.g., by minimizing a distance between the actuator and the user's ear(s) by being able to adjust the height of the upper body support section, e.g., to be substantially aligned with the user's ear(s) and/or to substantially lie in a single plane with the user's ears. For this purpose, the upper body support section may be movable relative to another section of the aircraft seat and/or the aircraft bed, e.g., relative to a backrest of the aircraft seat and/or to a lying portion of the aircraft bed. The upper body support section may be manually movable to adjust the height of the upper body support section. Alternatively, or additionally, the upper body support section may include at least one motor configured to drive and move the upper body support section to adjust the height thereof.

Preferably, the upper body support section has a concavity in at least a section thereof to at least partially receive the head and/or neck of a user therein, when the user's head and/or neck is resting against the resting surface of the upper body support section. By providing such a concavity in the upper body support section which may at least partially receive the head and/or neck of a user, when the user's head and/or neck is resting against the resting surface of the headrest or neck support, respectively, a semi-closed space may be provided in which the soundwaves generated by the actuator may efficiently and effectively be propagated. The sections delimiting the space may provide a passive noise reduction means by at least partially blocking sounds which are present and/or originating outside of the space from propagating into the space. This may enhance the experience of the acoustic system for the user, either for general generation of sound, such as music, or for active noise reduction provided by the acoustic system. In addition, this may reduce a level of disturbance to other occupants which may be caused by the operation of the acoustic system.

Preferably, the acoustic system can be communicatively coupled to an onboard system of the aircraft, preferably to an on-board entertainment system, and/or to an external mobile device, such as a smartphone or a tablet of a user. The acoustic system may be couplable to the onboard system of the aircraft and/or to the external mobile device via known connection means, i.e., either wirelessly, e.g., via Bluetooth or other available wireless connection means, or via a wire connection which may connect the acoustic system to the onboard system of the aircraft and/or to the external mobile device.

Preferably, the onboard system of the aircraft and/or the external mobile device may serve as a control device, e.g., an input device, and/or a display for the acoustic system. For instance, the onboard system of the aircraft and/or the external mobile device may be configured to receive automated and/or manual input commands to control at least one feature of the acoustic system. Thus, a user, for instance, the occupant seated in the aircraft seat and/or lying in the aircraft bed having an acoustic system as described herein, may control the function of the acoustic system as desired. This may increase the user-friendliness and/or appeal of the acoustic system to the user.

Preferably, the upper body support section includes an attachment device configured to releasably attach the upper body support section to a section of an aircraft seat and/or an aircraft bed. Providing a releasable attachment between the upper body support section and a section of an aircraft seat and/or an aircraft bed may facilitate the process for retrofitting existing aircraft seats and/or aircraft beds with the acoustic system described herein. Moreover, this may also facilitate servicing and/or replacing the acoustic system. For instance, a faulty acoustic system may be replaced by a replacement acoustic system by simply removing the entire upper body support section from the aircraft seat and/or aircraft bed via operation of the attachment device and replacing it with an upper body support section with a functioning acoustic system.

Preferably, the upper body support section includes a compartment configured to at least partially receive the actuator and secure the actuator therein. Such a compartment may facilitate installing the acoustic system in the upper body support section and/or protect the components of the acoustic system, e.g., the actuator, from external elements and/or from damage.

Preferably, the upper body support section includes at least one accessing element configured to allow external access to the actuator, and optionally also to further components of the acoustic system. Such an accessing element may facilitate servicing and/or replacing the acoustic system. For instance, a faulty acoustic system or at least a faulty component of the acoustic system, e.g., the actuator, may be replaced and/or serviced via the accessing element.

Preferably, the upper body support section includes at least one cushion element, wherein the actuator is configured to generate soundwaves which can at least partially propagate through the cushion element. This may increase the flexibility of the configuration of the acoustic system, e.g., by enabling a more flexible arrangement of the actuator within the upper body support section while assuring a sufficient propagation of soundwaves from the actuator to the ear(s) of the use sitting in the aircraft seat and/or lying on the aircraft bed.

Preferably, the cushion element allows at least 30%, preferably at least 40%, more preferably at least 50%, more preferably at least 60%, more preferably at least 70%, more preferably at least 80%, most preferably at least 90%, of an amplitude and/or of a sound pressure level of the soundwaves generated by the actuator to propagate through the cushion element.

Preferably, the upper body support section includes at least one first section, which includes at least one actuator and/or at least one sound sensing device, and at least one second section which is connected to the first section and is adjustably movable in a translational and/or rotatable manner relative to the first section to displace the first section to and/or away from the user's ear(s), when the user is sitting in the aircraft seat and/or is lying on the aircraft bed, respectively.

As detailed above, the acoustic system disclosed herein is advantageous in that the actuator and/or the sound sensing device is/are embedded in the upper body support section, e.g., a headrest and/or neck support, which is typically arranged relatively close to the user's ears, when the user is sitting in the aircraft seat and/or lying on the aircraft bed in a normal sitting and/or lying position. Thus, the soundwaves may be generated by the actuator in proximity of the user's ears and/or the soundwaves to be at least partially cancelled may be sensed in proximity of the user's ears. By configuring at least one section of the upper body support section, the section including at least one actuator and/or at least one sound sensing device, to be adjustably movable relative to a second section of the upper body support section may allow the position and/or orientation of the actuator and/or the sound sensing device to be further optimized with respect to user's ear(s), e.g., the distance between the actuator and the user's ear(s) and/or between the sound sensing device and the user's ear(s) may be further reduced. This may further increase the efficiency and/or the effectiveness of the active noise reduction provided by the acoustic system.

For the purpose of providing an adjustable movability of the first section of the upper body support section relative to the second section, the first section of the upper body support section may be foldable, pivotable or movable in any other manner relative to the second section. The movability of the first section of the upper body support section may be provided, e.g., by one or more hinge elements which connect the first section of the upper body support section to the second section of the upper body support section. The movability of the first section of the upper body support section may be achieved manually, e.g., the user may exert muscular force to effect the movement of the first section of the upper body support section relative to the second section of the upper body support section. Alternatively, or additionally, the movability of the first section of the upper body support section may be achieved by means of one or more actuators, preferably electrical actuators.

Preferably, the first section is a lateral section of the upper body support section, with respect to a coronal plane of the user, when the user is sitting in the aircraft seat and/or lying on the aircraft bed, wherein preferably the lateral section is foldable towards the user's ear(s), when the user is sitting in the aircraft seat and/or lying on the aircraft bed. Preferably, two lateral sections of the upper body support section, which are preferably arranged on substantially opposite ends of the upper body support section, may be foldable towards the user's ear(s).

Preferably, the acoustic system includes at least one further actuator and a structural member, preferably a paneling element and/or a wall element and/or a separating element, which is arrangeable at a distance from the aircraft seat and/or the aircraft bed in the interior of the aircraft and proximal to the user, when the user is sitting in the aircraft seat and/or is lying on the aircraft bed, wherein the at least one further actuator is embedded in the structural member. This may essentially provide a sound propagation environment around the user to increase the effectiveness and/or efficiency and/or user experience of the system described herein. Moreover, this may also increase the area which can be excited by the actuator, which may facilitate generating low frequencies, e.g., to increase the effectiveness and/or efficiency of the noise cancellation provided by the system described herein for sounds having low frequencies.

The object mentioned at the beginning is also solved by an aircraft seat according to a second aspect of the invention. The aircraft seat includes a backrest, a seating portion configured for a user to sit on and an acoustic system according to any configuration described herein. The upper body support section is attached to the backrest. The features and advantages as described above for the acoustic system apply to the aircraft seat accordingly.

Preferably, the aircraft seat further includes at least one actuator which is embedded at least partially within the backrest and configured to generate soundwaves in the backrest.

Preferably, at least one actuator is embedded at least partially within the seating portion and configured to generate soundwaves in the seating portion.

The object mentioned at the beginning is also solved by an aircraft bed according to a third aspect of the invention. The aircraft bed includes a lying portion configured for a user to lie on and an acoustic system according to any configuration described herein. The upper body support section is attached to the lying portion. The features and advantages as described above for the acoustic system apply to the aircraft bed accordingly.

Preferably, the aircraft bed further includes at least one actuator which is embedded at least partially within the lying portion and configured to generate soundwaves in the lying portion.

The object mentioned at the beginning is also solved by an aircraft according to a fourth aspect of the invention which includes an aircraft seat according to any of the configurations described herein and/or an aircraft bed according to any of the configurations described herein.

The features and advantages as described above for the acoustic system apply to the aircraft accordingly.

The following list of aspects provides alternative and/or further features of the invention:

1. An acoustic system for use in an interior of an aircraft, including:
   - a component of an aircraft seat, preferably an upper body support section, preferably a headrest and/or a neck support and/or a backrest and/or an armrest and/or a seating portion of the aircraft seat, and/or a component of an aircraft bed, preferably an upper body support section, preferably a headrest and/or a neck support and/or a lying portion and/or an armrest of the aircraft bed, wherein preferably the component defines at least one resting surface configured for at least a portion of a user's body, preferably the user's upper body, preferably the user's head and/or neck and/or arm(s) and/or shoulder(s) and/or back, to rest against; and
   - at least one transducer, preferably an actuator, wherein the transducer is embedded at least partially within the component of the aircraft seat and/or the component of the aircraft bed and configured to generate soundwaves.
2. The acoustic system according to aspect 1, wherein the actuator is configured to excite at least one surface to generate soundwaves in at least a section of the interior of the aircraft, preferably in at least a section of a proximity of the component of the aircraft seat.
3. The acoustic system according to aspect 1 or 2, wherein the acoustic system is configured to provide active noise reduction to at least one sound present in at least a section of a proximity of the component of the aircraft seat.
4. The acoustic system according to aspect 3, wherein the acoustic system is configured to provide a, preferably predetermined, degree of active noise reduction, preferably a minimum degree of active noise reduction, to the sound in an external space adjacent to the component of the aircraft seat and/or within a distance of 5 cm to 40 cm, preferably 5 cm to 35 cm, more preferably 5 cm to 30 cm, more preferably 5 cm to 25 cm, most preferably 5 cm to 20 cm, from a surface of the component of the aircraft seat, preferably from the resting surface.
5. The acoustic system according to aspect 4, wherein the minimum degree of active noise reduction is at least 30%, preferably at least 35%, more preferably at least 40%, preferably at least 45%, more preferably at least 50%, more preferably at least 55%, more preferably at least 60%, more preferably at least 65%, most preferably at least 70%, of an amplitude and/or a sound pressure level of the sound to be reduced;

and/or
   - wherein the minimum degree of active noise reduction is at least 30%, preferably at least 35%, more preferably at least 40%, more preferably at least 45%, more preferably at least 50%, more preferably at least 55%, more preferably at least 60%, more preferably at least 65%, more preferably at least 70%, more preferably at least 75%, more preferably at least 80%, more preferably at least 85%, most preferably at least 90%, of a sound energy of the sound to be reduced.

6. The acoustic system according to any of aspects 3 to 5, further including, for the purpose of providing active noise reduction, at least one sound sensing device configured to sense at least one sound in the interior of the aircraft, preferably within a distance of 40 cm, preferably 35 cm, more preferably 30 cm, more preferably 25 cm, most preferably 20 cm, from the resting surface, and at least one controller configured to receive information related to the sensed sound and to control the actuator to generate at least one sound to at least partially reduce the sensed sound based on the information.

7. The acoustic system according to aspect 6, wherein the acoustic system, preferably the sound sensing device and/or the controller, is configured to determine information related to the sensed sound, preferably at least one frequency and/or at least one phase and/or at least one amplitude of the sensed sound, and optionally to provide the information to the controller, such that the soundwaves generated by the actuator are at least in part based on the determined information.

8. The acoustic system according to aspect 6 or 7, wherein the acoustic system, preferably the sound sensing device and/or the controller, is configured to determine whether a property, preferably a frequency and/or a phase and/or an amplitude, of the sensed sound fulfills at least one predetermined criterion and to control the actuator to generate at least one sound to at least partially reduce the sensed sound if the predetermined criterion is fulfilled.

9. The acoustic system according to any of aspects 6 to 8, including a plurality of sound sensing devices, each being configured to sense at least one sound in the interior of the aircraft, preferably within a distance 40 cm, preferably 35 cm, more preferably 30 cm, more preferably 25 cm, most preferably 20 cm, from the resting surface, wherein the controller is optionally configured to control the actuator to generate at least one sound to at least partially reduce the sensed sound based at least in part on the sensed sounds.

10. The acoustic system according to aspect 9, wherein a first sound sensing device of the plurality of sound sensing devices is arranged closer to the user's head and/or neck, preferably closer to at least one of the user's ears, when the user's head and/or neck is resting against the resting surface of the component of the aircraft seat, than a second sound sensing device of the plurality of sound sensing devices.

11. The acoustic system according to aspect 10, wherein the first sound sensing device is arranged substantially in a sound path between the actuator and at least one of the user's ears, when the user's head and/or neck is resting against the resting surface of the component of the aircraft seat, and the second sound sensing device is arranged outside of the sound path.

12. The acoustic system according to any of aspects 6 to 11, wherein the sound sensing device is integrated at least partially, preferably entirely, within the component of the aircraft seat and/or aircraft bed, respectively.

13. The acoustic system according to any of the preceding aspects, wherein the acoustic system is configured to at least partially reduce sound generated by a propulsion system of the aircraft, preferably including at least one jet engine.

14. The acoustic system according to any of the preceding aspects, further including a plurality of actuators, at least one of which, preferably each of which, is embedded at least partially within the component of the aircraft seat and configured to generate soundwaves.

15. The acoustic system according to aspect 14, wherein at least one of the plurality of actuators is configured to simultaneously and/or sequentially generate soundwaves at a different amplitude and/or a different phase and/or a different frequency than at least a different one of the plurality of actuators.

16. The acoustic system according to any of the preceding aspects, further including an input device configured to receive automated or manual input commands to control at least one feature of the acoustic system.

17. The acoustic system according to aspect 16, wherein the feature includes at least one of the following: one or more amplitudes of the soundwaves generated by the actuator, one or more frequencies of the soundwaves generated by the actuator, a target area or a plurality of target areas in which soundwaves are to be generated in the component of the aircraft seat, a target main direction or a plurality of target main directions in which soundwaves are to be propagated in the interior of the aircraft, a degree of active noise reduction provided by the acoustic system, one or more frequencies of sound to be at least partially reduced by the acoustic system, one or more frequency ranges of sound to be at least partially reduced by the acoustic system, and an activation and/or deactivation of the active noise reduction function.

18. The acoustic system according to any of the preceding aspects, wherein the component of the aircraft seat includes at least one excitable surface which is sufficiently rigid such that the actuator can excite the excitable surface to generate soundwaves in the component of the aircraft seat.

19. The acoustic system according to any of the preceding aspects, wherein the component of the aircraft seat is at least partially made of one or more acoustically permeable materials.

20. The acoustic system according to aspect 19, wherein the acoustically permeable material(s) allow(s) at least 30%, preferably at least 40%, more preferably at least 50%, more preferably at least 60%, more preferably at least 70%, more preferably at least 80%, most preferably at least 90%, of an amplitude and/or of a sound pressure level of the soundwaves generated by the actuator to propagate through the acoustically permeable material(s).

21. The acoustic system according to any of the preceding aspects, wherein the component of the aircraft seat is configured as a headrest and/or a neck support including at least two lateral wing sections and an intermediate section connecting the wing sections to form a space which is at least partially delimited by the wing sections and the intermediate section to at least partially receive the head and/or neck of a user in the space, when the user's head and/or neck is resting against the resting surface of the headrest or neck support, respectively, wherein the wing sections each extend from the intermediate section at an angle from 90° to 175°, preferably from 100° to 165°, more preferably from 110° to 155°, more preferably from 110° to 145°, more preferably from 110° to 135°, most preferably from 110° to 130°, relative to the intermediate section.

22. The acoustic system according to any of the preceding aspects, wherein the component of the aircraft seat is adjustable in height.

23. The acoustic system according to any of the preceding aspects, wherein the component of the aircraft seat is configured as a headrest and/or neck support having a concavity in at least a section thereof to at least partially receive the head and/or neck of a user therein, when the user's head and/or neck is resting against the resting surface of the component of the aircraft seat.

24. The acoustic system according to any of the preceding aspects, wherein the acoustic system can be communicatively coupled to an onboard system of the aircraft, preferably to an on-board entertainment system, and/or to an external mobile device, such as a smartphone or a tablet of a user.

25. The acoustic system according to any of the preceding aspects, wherein the component of the aircraft seat includes an attachment device configured to releasably attach the component of the aircraft seat to a section of an aircraft seat and/or an aircraft bed.

26. The acoustic system according to any of the preceding aspects, wherein the component of the aircraft seat includes a compartment configured to at least partially receive the actuator and secure the actuator therein.

27. The acoustic system according to any of the preceding aspects, wherein the component of the aircraft seat includes at least one accessing element configured to allow external access to the actuator, and optionally also to further components of the acoustic system.

28. The acoustic system according to any of the preceding aspects, wherein the component of the aircraft seat includes at least one cushion element, wherein the actuator is configured to generate soundwaves which can at least partially propagate through the cushion element.

29. The acoustic system according to aspect 28, wherein the cushion element allows at least 30%, preferably at least 40%, more preferably at least 50%, more preferably at least 60%, more preferably at least 70%, more preferably at least 80%, most preferably at least 90%, of an amplitude and/or of a sound pressure level of the soundwaves generated by the actuator to propagate through the cushion element.

30. The acoustic system according to any of the preceding aspects, wherein the component of the aircraft seat and/or the component of the aircraft bed include(s) at least one first section, which includes at least one actuator and/or at least one sound sensing device, and at least one second section which is connected to the first section and is adjustably movable in a translational and/or rotatable manner relative to the first section to displace the first section to and/or away from the user's ears, when the user is sitting in the aircraft seat and/or is lying on the aircraft bed, respectively.

31. The acoustic system according to aspect 30, wherein the first section is a lateral section of the component, with respect to a coronal plane of the user, when the user is sitting in the aircraft seat and/or lying on the aircraft bed, wherein preferably the lateral section is foldable towards the user's ear(s), when the user is sitting in the aircraft seat and/or lying on the aircraft bed.

32. The acoustic system according to any of the preceding aspects, including at least one further actuator and a structural member, preferably a paneling element and/or a wall element and/or a separating element, which is arrangeable at a distance from the aircraft seat and/or the aircraft bed in the interior of the aircraft and proximal to the user, when the user is sitting in the aircraft seat and/or is lying on the aircraft bed, wherein the at least one further actuator is embedded in the structural member.

33. An aircraft seat including a backrest, a seating portion configured for a user to sit on and an acoustic system according to any of the preceding aspects, wherein the component of the aircraft seat, preferably a headrest and/or a neck support, is attached to the backrest.

34. The aircraft seat according to aspect 33, further including at least one actuator which is embedded at least partially within the backrest and configured to generate soundwaves in the backrest.

35. The aircraft seat according to aspect 33 or 34, wherein at least one actuator is embedded at least partially within the seating portion and configured to generate soundwaves in the seating portion.

36. An aircraft bed including a lying portion configured for a user to lie on and an acoustic system according to any of aspects 1 to 32, wherein the component of the aircraft seat, preferably a headrest and/or a neck support, is attached to the lying portion.

37. The aircraft bed according to aspect 36, further including at least one actuator which is embedded at least partially within the lying portion and configured to generate soundwaves in the lying portion.

38. An aircraft including an aircraft seat according to any of aspects 33 to 35 and/or an aircraft bed according to aspect 36 or 37.

BRIEF DESCRIPTION OF THE DRAWINGS

Preferred embodiments of the present invention are further elucidated below with reference to the figures. The described embodiments do not limit the present invention.

DETAILED DESCRIPTION

Figure 1:
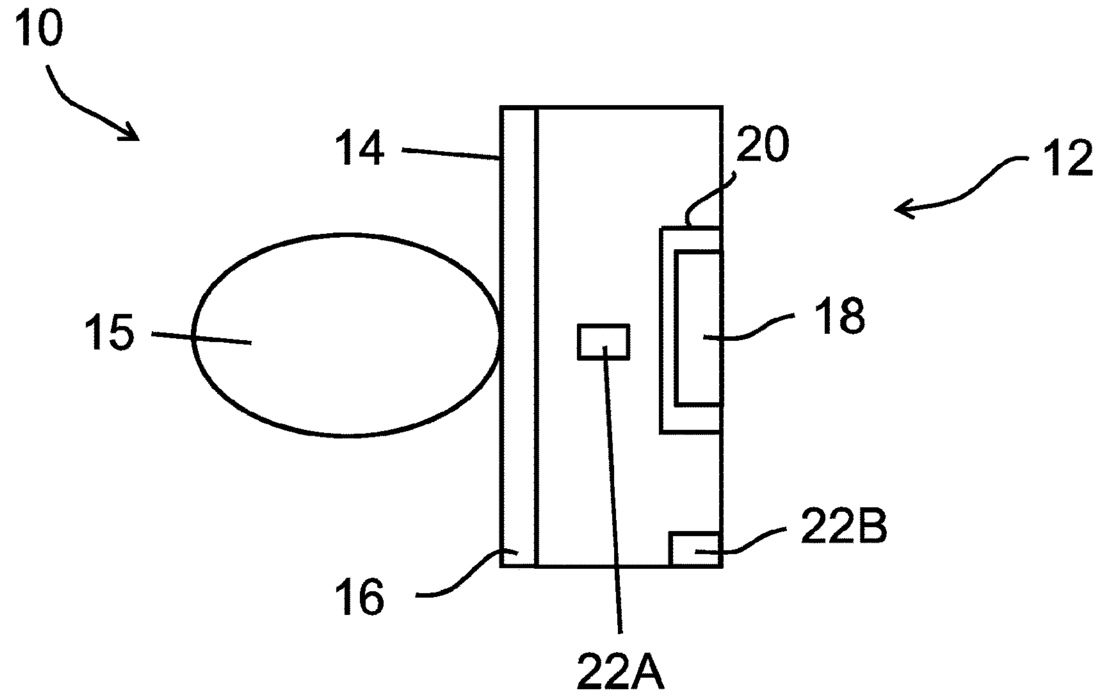
FIG. 1 shows, in a cross-sectional top view, a first embodiment of an acoustic system according to a first aspect of the invention.

FIG. 1 shows an acoustic system 10 which includes an upper body support section 12 for use with an aircraft seat and/or an aircraft bed, as described further below in connection with FIGS. 3 and 4. In the embodiments shown in the Figures, the upper body support section 12 is configured as a headrest 12. However, in general, the upper body support section 12 may be any structure configured to support at least a portion of the user's upper body, e.g., the user's neck and/or shoulder(s) and/or head and/or back and/or arm(s), when the user is sitting in the aircraft seat and/or lying on the aircraft bed. For instance, the upper body support section 12 may alternatively be configured as a neck support and/or a backrest and/or an armrest.

The headrest 12 defines a resting surface 14 configured for a user's head 15, which is shown schematically as an ellipse in FIG. 1, to rest against. The headrest 12 includes a cushion element 16, an outer perimeter or contour of which defines the resting surface 14.

Optionally, the headrest 12 may include a cover element (not shown) which covers at least a portion of an outer contour of the headrest 12. The cover element may define at least a portion of the resting surface 14.

The headrest 12 may be configured to be attached to an aircraft seat and/or an aircraft bed. For instance, the headrest 12 may include an attachment mechanism (not shown) configured to attach the headrest 12 to the aircraft seat and/or the aircraft bed. The attachment mechanism may include a release mechanism for releasing the attachment of the headrest 12 to the aircraft seat and/or the aircraft bed so that the headrest 12 may be removed again from the aircraft seat and/or the aircraft bed, e.g., to service and/or replace the acoustic system 10.

Alternatively, the headrest 12 may be formed integrally with the aircraft seat and/or the aircraft bed, such as with a backrest of the aircraft seat and/or a lying portion of the aircraft bed, or the headrest 12 may at least be connected with the aircraft seat and/or the aircraft bed in a non-separable manner such that the headrest 12 cannot be separated from the rest of the aircraft seat and/or the aircraft bed, respectively, without substantially compromising the integrity of the headrest 12 and/or the aircraft seat and/or the aircraft bed.

The acoustic system 10 further includes an actuator 18 which is embedded within the headrest 12 and configured to generate soundwaves.

The actuator 18 may be powered by a source of energy, e.g., electrically by one or more batteries and/or by an aircraft electrical system (not shown), and configured to receive an electrical signal, e.g., from a controller (not shown), and convert the source of energy powering the actuator 18 into motion of the actuator 18. Thus, the actuator 18 may also be referred to as a transducer. The actuator 18 may be configured to transmit the motion to a surface, which may excite the surface to generate pressure waves, i.e., soundwaves. The soundwaves may propagate in the proximity of the headrest and/or in at least a section of a proximity of a user seated in the aircraft seat or lying in the aircraft bed.

For this purpose, as shown in FIG. 1, the acoustic system 10 includes an excitable surface 20 which partially envelopes the actuator 18 towards the resting surface 14. The surface 20 may be excited by the actuator 18 to generate soundwaves within the headrest 12. The excitable surface 20 may be arranged substantially within the headrest 12, as shown in FIG. 1. Additionally, or alternatively, the excitable surface 20 may at least partially be formed by an outer surface, i.e., an outer contour, of the headrest 12.

The headrest 14 may also be configured to be adjustable in height and/or rotatable about an axis of rotation to optimize the effects of the actuator 18 to the user seated in the aircraft seat or lying on the aircraft bed, e.g., by minimizing a distance between the actuator 18 and the user's ear(s) by being able to adjust the height and/or the position of the headrest 12, e.g., to be substantially aligned with the user's ear(s) and/or to substantially lie in a single plane with the user's ears. For this purpose, the headrest 12 may be translationally movable and/or rotatable relative to another section of the aircraft seat and/or the aircraft bed, e.g., relative to a backrest of the aircraft seat and/or to lying portion of the aircraft bed. The headrest 12 may be manually movable and/or rotatable. Alternatively, or additionally, the headrest 12 may include at least one motor (not shown) configured to drive and move the headrest 12 to adjust the height and/or rotational position thereof.

The acoustic system 10 may be configured to play music and/or other audio, such as a film soundtrack and/or in-flight information provided by a flight crew, e.g., a pilot, of the aircraft. Alternatively, or additionally, the acoustic system 10 may be configured to provide active noise reduction to at least one sound present in at least a section of a proximity of the headrest 12.

The sound for which active noise reduction may be provided by the acoustic system 10 may be induced by the aircraft itself, e.g., by the propulsion system of the aircraft, and/or through interaction with the aircraft's environment, e.g., by flow noise caused by the flow of air along the outer surface of the aircraft.

Active noise reduction is generally achieved by generating a soundwave by the actuator 18 which is counter-phased, or anti-phased, to the soundwave of the sound to be reduced and has substantially the same or similar amplitude as the sound to be reduced. Thus, by superpositioning the soundwave of the sound to be reduced and the soundwave generated by the actuator 18, the sound to be reduced may effectively be reduced or cancelled.

The acoustic system 10 may further include, for the purpose of providing active noise reduction, two sound sensing devices 22A, 22B, each being configured to sense at least one sound in the proximity of the headrest 12. Preferably, the sound sensing devices 22A, 22B are each configured to sense a sound within a distance of 40 cm, preferably 35 cm, more preferably 30 cm, more preferably 25 cm, most preferably 20 cm, from the resting surface 14. The sound sensing devices 22A, 22B may be arranged substantially within the headrest 12. Such an integrated arrangement of the sound sensing devices 22A, 22B in the headrest 12 may reduce the obtrusiveness of the sound sensing devices 22A, 22B, which may increase the user friendliness of the acoustic system 10 described herein.

The actuator 18 and/or the sound sensing devices 22A, 22B may be arranged in a first section of the headrest 12 which is connected to a second section of the headrest 12 and is adjustably movable in a translational and/or rotatable manner relative to the second section of the headrest 12 to displace the first section, and thus the actuator 18 and/or the sound sensing devices 22A, 22B, to and/or away from the user's ear(s), when the user is sitting in the aircraft seat and/or is lying on the aircraft bed, respectively. For instance, the first section may be foldable relative to the second section.

This may allow the position and/or orientation of the actuator 18 and/or the sound sensing devices 22A, 22B to be further optimized with respect to the user's ear(s), e.g., a distance between the actuator 18 and the user's ear(s) and/or between the sound sensing devices 22A, 22B and the user's ear(s) may be further reduced. This may further increase the efficiency and/or the effectiveness of the active noise reduction provided by the acoustic system 10.

Alternatively, or additionally, at least one sound sensing device may be arranged outside of the headrest 12, e.g., on an outside surface of the headrest 12 or not even attached to the headrest 12, e.g., on another section of the aircraft seat and/or aircraft bed. At least one sound sensing device 22A, 22B may be connected to a support structure and/or housed in a housing (not shown), the support structure and/or the housing being attached to a portion of the aircraft seat and/or an aircraft bed, respectively, e.g., the headrest 12, and extending from the aircraft seat and/or the aircraft bed, respectively, towards the user's ear(s), or at least towards a proximity of the user's ear(s), when the user is sitting in the aircraft seat or lying in the aircraft bed, preferably when the user's head is resting on the resting surface 14 or is at least arranged proximate to the resting surface 14. This may enable the sound sensing device(s) 22A, 22B to be positioned relatively close to the user's ear(s), which may enhance the effectiveness and/or efficiency of the sound sensing device 22A, 22B within the context of providing active noise reduction by the acoustic system 10 as described herein.

The sound sensing devices 22A, 22B may provide information related to the sensed sound to at least one controller (not shown) configured to control the actuator 18 based on the information to generate at least one sound to at least partially reduce the sensed sound based on the information. Preferably, the sound sensing devices 22A, 22B are microphones. However, any device which is capable of sensing sound may be used.

A first sound sensing device 22A of the plurality of sound sensing devices is arranged closer to the user's head 15, preferably closer to at least one of the user's ears, when the user's head 15 is resting against the resting surface 14 of the headrest 12, than a second sound sensing device 22B of the plurality of sound sensing devices.

In particular, the first sound sensing device 22A is arranged substantially in a sound path between the actuator 18 and at least one of the user's ears, when the user's head 15 is resting against the resting surface 14 of the headrest 12, and the second sound sensing device 22B is arranged outside of the sound path.

The second sound sensing device 22B which is arranged farther from the user's head 15, preferably outside of the sound path, may detect the sound to be reduced without, or only minimally, detecting the soundwave generated by the actuator 18. Based hereon, the characteristics, e.g., the frequency and/or phase and/or amplitude, of the soundwaves generated by the actuator 18 may be determined. The first sound sensing device 22A provided closer to the user's head 15, preferably in the sound path between the actuator 18 and at least one of the user's ears, may detect the sound to be reduced and the soundwaves generated by the actuator 18. Thus, a superposition of the soundwaves of the sound to be reduced and the soundwaves generated by the actuator 18 may be detected by the first sound sensing device 22A. Hence, the first sound sensing device 22A may help determine the effectiveness of the active noise reduction provided by the actuator 18. The detection of the superposition of the soundwaves of the sound to be reduced and the soundwaves generated by the actuator 18, and the information associated therewith, may also be provided as feedback to the acoustic system 10, e.g., to a controller of the acoustic system 10, to control the actuator 18 at least partially based on this feedback.

More than two sound sensing devices may also be used. Alternatively, only one sound sensing device may be provided. Further alternatively, no sound sensing devices may be provided for the acoustic system 10.

Figure 2:
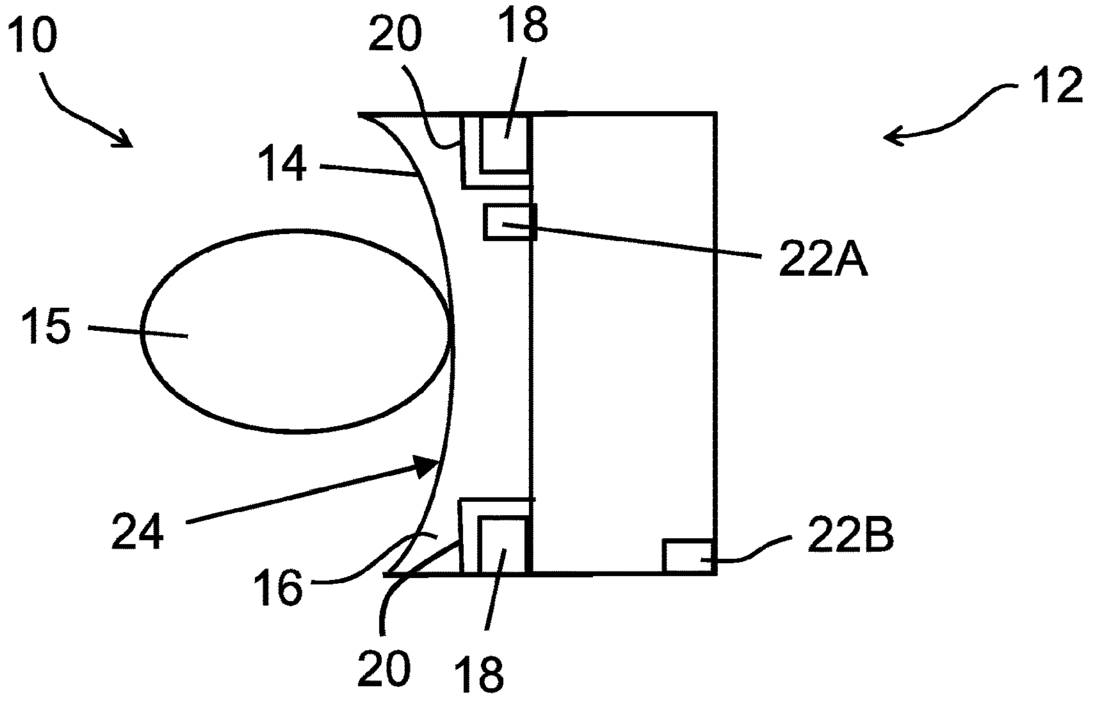
FIG. 2 shows, in a cross-sectional top view, a second embodiment of an acoustic system.

FIG. 2 shows a further embodiment of the acoustic system 10. The acoustic system 10 includes many of the features shown in FIG. 1, which will not be discussed in detail again for the sake of simplicity. In contrast to the embodiment shown in FIG. 1, the headrest 12 of the acoustic system 10 shown in FIG. 2 includes a concavity 24 which may at least partially receive the head 15 of a user, when the user's head 15 is resting against the resting surface 14 of the headrest 12, as shown in FIG. 2. Thus, a semi-closed space may be provided by the concavity 24 in which the soundwaves generated by the actuator 18 may efficiently and effectively be propagated. The sections delimiting the space may provide a passive noise reduction means by at least partially blocking sounds which are present and/or originating outside of the space from propagating into the space. This may enhance the experience of the acoustic system 10 for the user, either for general generation of sound, such as music, or for active noise reduction provided by the acoustic system. In addition, this may reduce a level of disturbance to other occupants which may be caused by the operation of the acoustic system 10.

Also in contrast to FIG. 1, the acoustic system 10 shown in FIG. 2 includes two actuators 18, wherein the actuators 18 and the sound sensing devices 22A, 22B are arranged in the cushion element 16. However, the arrangement of the sound sensing devices 22A, 22B as shown in FIG. 2 is only exemplary. The sound sensing devices 22A, 22B may be arranged in a different section of the headrest 12, e.g., outside of the cushion element 16 and/or extending from the headrest 12, as described above.

Figure 3:
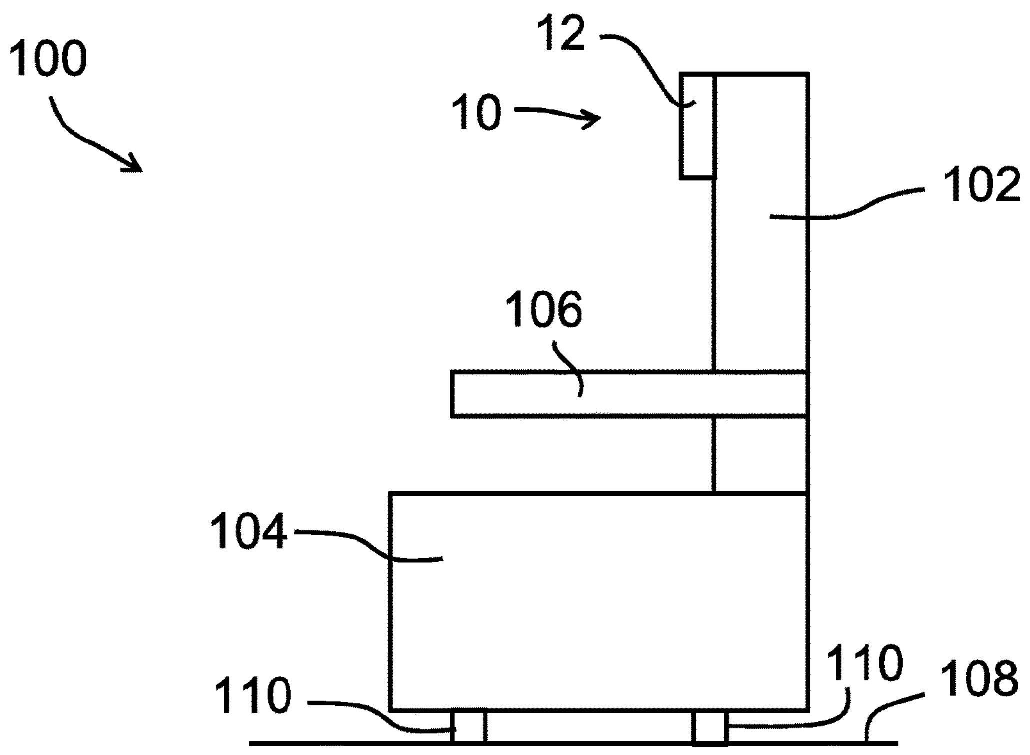
FIG. 3 shows, in a cross-sectional side view, an aircraft seat according to a second aspect of the invention with the acoustic system as shown in FIG. 1 or 2.
Figure 4:
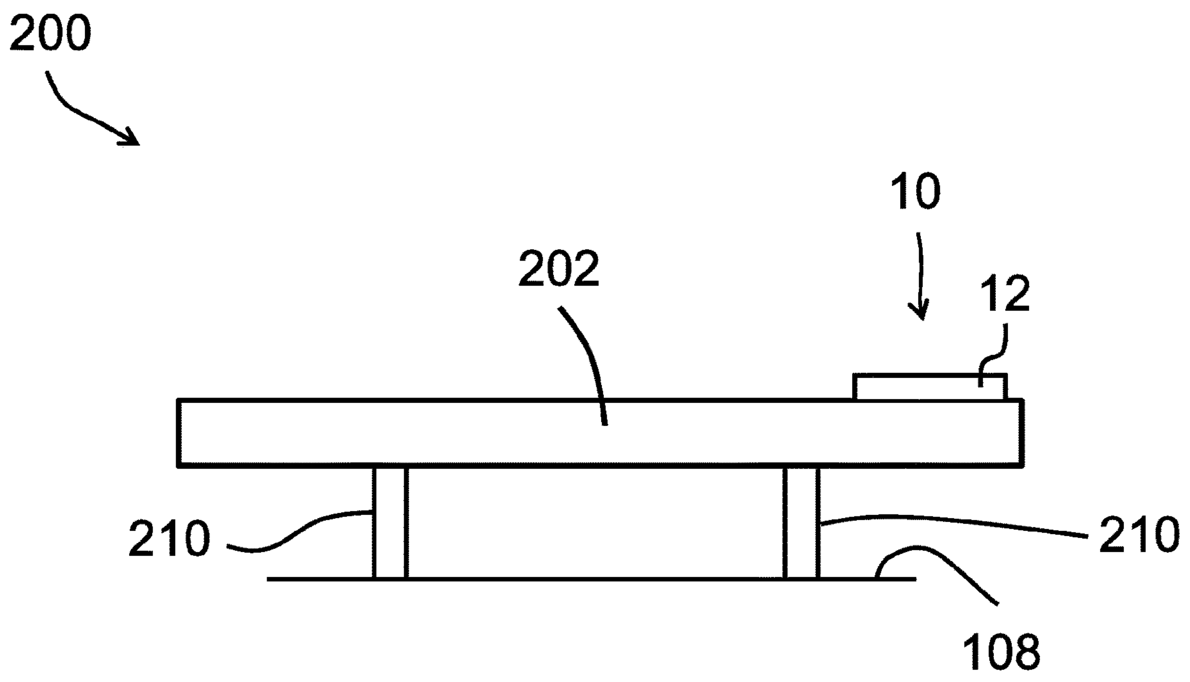
FIG. 4 shows, in a cross-sectional side view, an aircraft bed according to a third aspect of the invention with the acoustic system as shown in FIG. 1 or 2.

FIGS. 3 and 4 shows embodiments of an aircraft seat 100 and an aircraft bed 200, respectively, which both include an acoustic system 10, e.g., configured according to any of the embodiments described herein, such as those shown in FIGS. 1 and 2, respectively. The features of the acoustic system 10 will not be discussed in detail again for the sake of simplicity.

The aircraft seat 100 shown in FIG. 3 includes a backrest 102, a seating portion 104 configured for a user to sit on, at least one armrest 106 and an acoustic system 10 according to any of the configurations described herein. The headrest 12 of the acoustic system 10 is attached to the backrest 102. In addition, the aircraft seat 100 is attached to a floor 108 of an aircraft by means of attachment elements 110.

The aircraft bed 200 shown in FIG. 4 includes a lying portion 202 configured for a user to lie on and an acoustic system 10 according to any of the configurations described herein. The headrest 12 of the acoustic system 10 is attached to the lying portion 202. In addition, the aircraft bed 200 is attached to a floor 108 of an aircraft by means of attachment elements 210.

Figure 5:
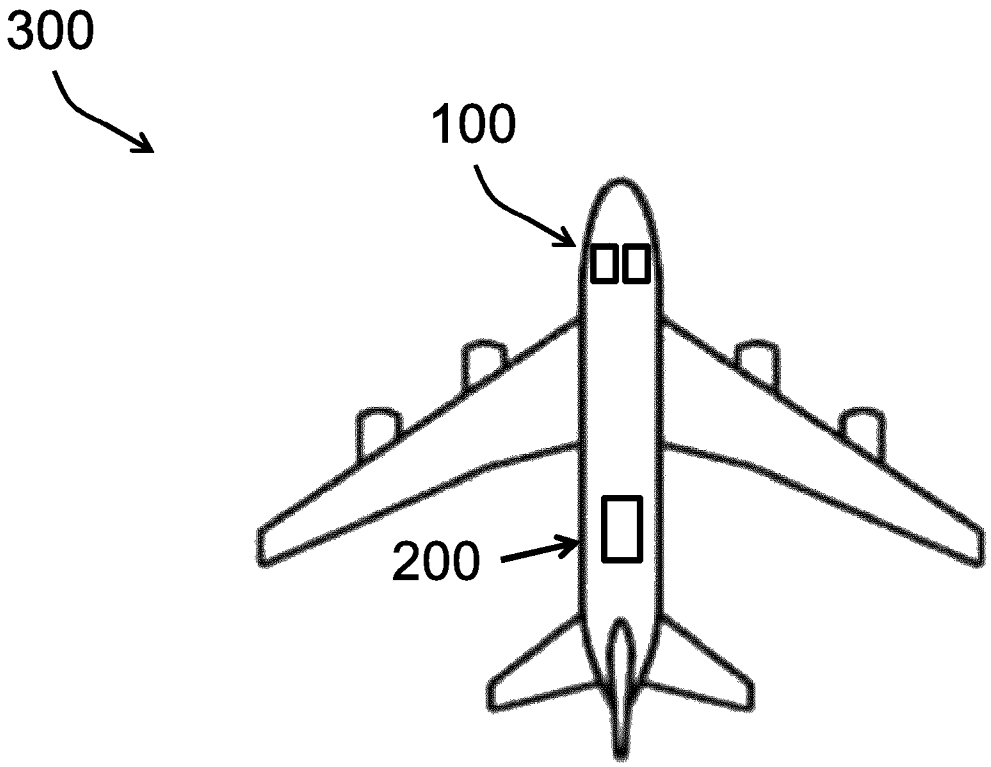
FIG. 5 shows, in a cross-sectional top view, an aircraft according to a fourth aspect of the invention with the aircraft seat and the aircraft bed according to the embodiments shown in FIGS. 3 and 4.

FIG. 5 shows an aircraft 300 including aircraft seats 100 and an aircraft bed 200 in an interior of the aircraft 300. The aircraft seats 100 and the aircraft bed 200 may be configured according to the aircraft seat 100 and the aircraft bed 200 shown in FIGS. 3 and 4, respectively. The aircraft seats 100 and/or aircraft bed 200 may have an acoustic system 10 according to any of the embodiments described herein. The aircraft 300 may have any number of aircraft seats 100 and/or aircraft beds 200. Some or all of the aircraft seats 100 and/or aircraft beds 200 provided in the interior of the aircraft 300 may be provided with an acoustic system 10.

The invention claimed is:

1. An acoustic system for use in an interior of an aircraft, including:

an upper body support section for use with at least one of an aircraft seat or an aircraft bed, the upper body support section defining at least one resting surface configured for at least a portion of an upper body of a user to rest against; and at least one actuator, wherein the at least one actuator is embedded at least partially within the upper body support section and configured to generate soundwaves, wherein the upper body support section includes at least one excitable surface which the at least one actuator can excite to generate soundwaves in the upper body support section, wherein the acoustic system is configured to provide a minimum degree of active noise reduction to at least one sound in an external space adjacent to the upper body support section and within a distance of 5 cm to 40 cm from the at least one resting surface of the upper body support section;

wherein the acoustic system further includes, for the purpose of providing the active noise reduction, at least one sound sensing device configured to sense the at least one sound in the interior of the aircraft within a distance of 40 cm from the at least one resting surface, and at least one controller configured to receive information related to the sensed at least one sound and to control the at least one actuator to generate at least one soundwave to at least partially reduce the sensed at least one sound based on the information.

2. The acoustic system according to claim 1, wherein the acoustic system is configured to provide a predetermined minimum degree of active noise reduction to the at least one sound and within a distance of 5 to 35 cm from the at least one resting surface.

3. The acoustic system according to claim 2, wherein the minimum degree of active noise reduction is at least 30% of at least one of (i) an amplitude of the at least one sound, (ii) a sound pressure level of the at least one sound, or (iii) a sound energy of the at least one sound.

4. The acoustic system according to claim 1, wherein the information comprises at least one of a frequency, a phase, or an amplitude of the sensed at least one sound.

5. The acoustic system according to claim 4, wherein the at least one sound sensing device is configured to provide the information to the at least one controller, such that the at least one soundwave generated by the at least one actuator is based on the information at least in part.

6. The acoustic system according to claim 1, wherein the at least one controller is configured to determine whether at least one of a frequency, a phase, or an amplitude of the sensed at least one sound fulfills at least one predetermined criterion, and to control the at least one actuator to generate the at least one soundwave to at least partially reduce the sensed at least one sound if the at least one predetermined criterion is fulfilled.

7. The acoustic system according to claim 1, wherein the at least one sound sensing device comprises a plurality of sound sensing devices, each being configured to sense the at least one sound, wherein the at least one controller is configured to control the at least one actuator to generate the at least one soundwave to at least partially reduce the sensed at least one sound.

8. The acoustic system according to claim 7, wherein a first of the plurality of sound sensing devices is arranged closer to a head of the user, when the portion of the upper body of the user is resting against the at least one resting surface, than a second of the plurality of sound sensing devices.

9. The acoustic system according to claim 8, wherein the first sound sensing device is arranged closer to at least one ear of the user, when at least one of the head or a neck of the user is resting against the at least one resting surface, than the second sound sensing device.

10. The acoustic system according to claim 9, wherein the first sound sensing device is arranged in a sound path between the at least one actuator and the at least one ear of the user, when the portion of the upper body of the user is resting against the at least one resting surface, and wherein the second sound sensing device is arranged outside of the sound path.

11. The acoustic system according to claim 1, wherein the upper body support section has a concavity in at least a section thereof to at least partially receive at least one of a head or a neck of the user, when at least one of the head or neck of the user is resting against the at least one resting surface.

12. The acoustic system according to claim 1, wherein the acoustic system is configured to be communicatively coupled to at least one of an onboard system of the aircraft or to an external mobile device.

13. The acoustic system according to claim 12, wherein the onboard system comprises an entertainment system.

14. The acoustic system according to claim 1, wherein the at least one actuator comprises a plurality of actuators, wherein at least one of the plurality of actuators is configured to simultaneously or sequentially generate one of the at least one soundwaves at at least one of a different amplitude, a different phase, or a different frequency than a different one of the plurality of actuators.

15. The acoustic system according to claim 1, further comprising the aircraft seat, wherein the aircraft seat comprises a backrest, wherein the upper body support section is attached to the backrest.

16. The acoustic system according to claim 1, further comprising the aircraft bed, wherein the aircraft bed comprises a lying portion, wherein the upper body support section is attached to the lying portion.

17. The acoustic system according to claim 1, further comprising the aircraft.

* * * * *